United States Patent Office 2,744,015

Patented May 1, 1956

2,744,015

FEED PRODUCT

Tetsuo Katsube, Ishioka-cho, Ibaragi-ken, Japan, assignor of one-half to Kosuke Matsukata, Yokohama, Japan No Drawing. Application May 12, 1953, Serial No. 354,623

8 Claims. (Cl. 99—9)

My invention relates to a feed for domestic animals, more particularly to a nutritive feed containing a culture fluid of a certain nitrogen-fixing bacillus and effective for promoting the growth and breeding of animals, particularly effective for elevating the lactation and fat yield of cows and the method of preparation of such feed.

Heretofore, several attempts have been made in the use of microorganisms for preparing nutritive feeds for domestic animals for the purpose of promoting the growth and/or breeding of animals, increasing the milk secretion of cows, increasing the egg production of hens, etc. In most cases, microorganisms hitherto used for such purposes belong to the group of yeast or molds (hyphomycetes). They are cultivated on a feed by solid cultivation method and given to animals. Such a feed, however, has several disadvantages as follows: (*a*) It does not meet the taste of animals. (*b*) Large areas and cumbersome operations are required for production in large quantity with consequent high cost. (*c*) Formation of unsuitable feed by contamination with wild microorganisms.

Recently, I have found that the culture of nitrogen-fixing *Bacillus Clostridium butyricum* has a strong action to promote the growth and breeding of animals and is particularly useful for elevating the lactation and fat yield of cows.

Commercial use of this nitrogen-fixing *Bacillus Clostridium butyricum* for preparation of nutritive feed for domestic animals has been attained by separating inoculant from plants belonging to the family of Fabaceae, cultivating the inoculant in an aqueous medium containing materials from vegetable sources as essential ingredients, stabilizing the grown culture fluid by adsorption on an adsorbent and making up a ration with the stabilized culture fluid carried on said adsorbent.

My feed containing the stabilized culture of nitrogen-fixing *Bacillus Clostridium butyricum* is readily accepted by animals and possesses properties as result in an increase in weight, increased lactation and fat yield of cows, increased egg-laying of hens, in a substantial degree, and in a relatively short period. Also, the rate of conception is increased. The feed of my invention has further an advantage in that it promotes the general health of animals by aiding digestion, enabling perfect absorption of nutrients and strengthening the internal organs. Generally, continued secretion of milk in large quantity is accompanied by dissipation in physical strength and loss in weight. Contrary to this general conception, when cows are fed with the feed of my invention, a large quantity of milk rich fat is secreted for a continued period without loss but gain in weight. Further, it has been found that expensive wheat bran in the feed can be saved by the use of the feed of my invention, without affecting the activity of the cows.

The dose of grown culture may be varied widely. In general, for animals having a long digestion period such as a cow which keeps food in the body for about forty-eight hours, a small dose relative to the weight of body is sufficient whereas for animals having a short digestion period such as fowl, with very short intestines, large dose relative to the weight of body is required to yield effective results. Thus, a dose of 350 grams of the grown culture fluid of standard potency is mixed in a daily ration for grown milk cows whereas 1 gram is mixed in a daily ration for grown hens. While the above quantity is considered ordinarily to be sufficient, larger doses produce no ill effects.

The following advantages were observed when animals were fed with feed containing a grown culture of the nitrogen-fixing *Bacillus Clostridium butyricum* prepared according to my invention.

*1. Cows.*—A herd of about 800 were fed with the feed of my invention for one year. They received the feed with good appetite and digested completely. In average, lactation was increased by 10% and fat content percentage of milk by 0.35%. Range of increase in both items was from 8 to 25% for the former and from 0.2 to 0.6% for the latter. The rate of conception was increased. All cows became stronger and heavier and some cows which had indigestion before were completely cured of it.

*2. Chickens.*—Grew rapidly and commenced to lay eggs within five and a half months.

*3. Hens.*—Production of eggs was increased by about 10%.

*4. Pigs.*—Rapid growth and increased rate of conception were observed.

Other objects and advantages of my invention will be obvious from the detailed description set forth below.

In a series of experiments on the cultivation of yeast in various culture mediums. I have found that a certain obligate anaerobic bacillus having flagellum grows in the medium when extract of seeds of plants belonging to the family of Fabaceae are used in the medium. The bacillus is relatively weak to heat and is destroyed when exposed to a temperature above 60° C. for more than thirty minutes. But spores are strongly resistant to heat, are not destroyed by repeated heating to 100° C. for thirty minutes, and germinate under favorable conditions. A fluid containing the spore-forming bacilli was heated repeatedly to 100° C. for 30 minutes until all other microorganisms are destroyed except *Bacillus subtilis* which is not killed by such treatment. By placing the fluid containing the spore-forming bacillus and *Bacillus subtilis* under conditions excluding air, the latter which is aerobic is killed and only the former which is anaerobic survives. Using the pure culture thus obtained as inoculant, pure cultivation of this anaerobic bacillus was studied in various mediums. It was found that a medium containing materials from vegetable sources, such as extract of corn, peanut, soybean or wheat flour, is most favourable for this purpose. Best results were obtained in an aqueous medium containing extracts of soybean and wheat flour. The bacillus has no gelatin-liquifying action. Optimum pH for the cultivation is pH 7 and optimum temperature 35–40° C. This bacillus has been identified as the nitrogen-fixing *Bacillus Clostridium butyricum*. It causes gradual fixation of free nitrogen as protein and has also a fermenting action to convert starch to butyric acid, the latter change being accompanied by the evolution of carbon dioxide gas. Iron oxide is harmful for cultivation and soft water free from iron should be used.

Microscopic study on the progress of growth of the bacillus was made. Population of bacillus increased and reached the maximum in about seventy-two hours, after which they decreased, became less lively and finally were totally killed in accordance with the normal growth curve for such organisms. This loss of activity is due to the bacteriolysis and the action of bacteriophage.

It is essential that the bacilli in the culture are in the living state at the time of administration. Grown culture fluid of the azobacter is useful only within about a week after the incubation because the bacilli, if left in the fluid longer, the organisms become destroyed by bacteriolysis or bacteriophage. Such short period of usefulness limits the commercial use of the azobacter. If carbon dioxide gas evolved is constantly removed from the culture bottle and pH of the fluid maintained at pH 7, the bacilli can be maintained in active state as long as thirty days. For commercial purpose, however, a simpler method which does not require such rigid control and which enables the preservation or stabilization of the grown culture for a longer period, such as six months or longer, is desirable. I have found that when the grown culture broth is adsorbed on an adsorbent and the adsorbent carrying the culture is kept in a relatively dry atmosphere, the bacilli stop to grow but are preserved in living state as long as six months. The bacillus begins to grow again when favorable humidity and temperature conditions are present. A portion or a component of feed, such as wheat bran, or mineral absorbent, such as bentonite, may be used as the absorbent. Nutritious materials in the culture fluid are also adsorbed on the adsorbent and preserved in stable state. Adsorbent carrying the stabilized culture may be mixed with the necessary amount of ordinary feed to make up a ration at any time within the period of six months. Since the temperature in the body of animal is within the optimum range for the growth of the azobacter, when such stabilized culture is taken by animal the bacillus grows in the body and multiply the advantageous effects.

Typical examples will be given below.

Preparation of inoculant

Crushed soybean was mixed with distilled water and the mixture kept at atmospheric temperature for ten hours. After boiling at 100° C. for thirty minutes, the mixture was filtered and the filtrate placed in a test tube. By such treatment all microorganisms other than the spore-forming *Bacillus Clostridium butyricum* and *Bacillus subtilis* are destroyed. The fluid containing the spore-forming nitrogen-fixing *Bacillus Clostridium butyricum* and *Bacillus subtilis* in the test tube was covered with liquid paraffin in a thickness of 0.3 cm., the test tube plugged with sterile cotton and the whole placed in an incubator for twenty-four hours, at the end of which the fluid changed to a turbid broth. By this incubation excluding air, aerobic *Bacillus subtilis* is killed and only the anaerobic spore-forming *Bacillus Clostridium butyricum*, survives in the fluid. A drop of the fluid was taken for microscopic examination and when other microorganisms were found still to remain, above procedures were repeated until all other microorganisms than the desired spore-forming *Bacillus Clostridium butyricum* have been destroyed. Fluid thus obtained was used as inoculant. Alternately, stabbed culture in an agar medium consisting of 1,000 ml. of liquor boiled out from soybean and twenty grams of agar may be made or the fluid may be adsorbed on an adsorbent, such as bentonite and either may be used as inoculant.

Preparation of culture fluid

Five liters of water free from iron were added to a half kilogram of soybean, a half kilogram of mealed soybean and twenty grams of wheat flour (from which gluten has been removed) and pH of the mixture adjusted to pH 7. The mixture was boiled for fifty minutes and filtered. The filtrate containing the extracts of soybean and wheat flour was sterlized by conventional method, such as Koch's fractional sterilization, heating at high pressure or filtration through Berkesfeld filter or Chamberland's filter. The sterilized filtrate was placed in a 3 liter sterilized bottle and readjusted to pH 7. A small amount of inoculant fluid prepared as above described was added. Better results were obtained when 10 g. of vitamin $B_1$ and 0.1 g. of calcium salt were added to the sterilized fluid at the time of inoculation. The bottle was plugged with sterile cotton and placed in an incubator maintained at 35–40° C. for seventy-two hours. The bacillus grew and the initially yellow liquid changed to a light-white turbid broth having foams on the surface. Grown culture fluid at the end of the culture was a bacillus population of over 600 million per millilitre of fluid. Bacillus concentration of 600 million in one millilitre was taken as the standard potency and when fluid after the incubation of 72 hours was weaker than the standard in potency, that is population of the bacillus in the fluid was less than 600 million/ml., culture was continued until population corresponding to the standard potency was obtained.

Stabilization

Eighteen liters of grown culture fluid prepared as described above were sprayed on thirty-seven kilograms of wheat bran using a conventional sprayer and mixed well. In another method for 200 cc. of the culture fluid, 1 kilogram of bentonite was sprayed and mixed well.

Recently, antibiotics produced by some microorganisms have become widely utilized for raising domestic animals. In some cases, such antibiotics are also mixed with feed and given to animals. Feed of my invention is clearly distinguished from such feed mixed with antibiotics in that while products of the microorganism are also effective constituents, the main effective constituent of my feed is the living microorganism itself, my feed does not become ineffective on continued use and it is useful not only for growing but also for breeding whereas antibiotics are useful only for growing and become ineffective on continued use for a relative short period due to the development of resistivity against the action of the medicine. Further, in the case of antibiotics, correct and homogeneous mixing is necessary because the effect depends solely on the concentration of the antibiotic in the portion of feed taken by animal, whereas in the case of the feed of my invention such precise mixing is unnecessary because the main effective component is a living microorganism which can grow in the body of animal.

It is obvious that several modification can be made without departing from the spirit of my invention. For example, in above statement, grown culture fluid was first adsorbed on wheat bran or bentonite to make a concentrate which in turn was diluted to a ration, but other materials such as rice bran, barley bran, soybean oil-cake, cocoanut oil-cake, starch lees, soybean sauce less may be used as adsorbent to make such concentrate. Therefore, it will be understood that my invention is not strictly limited to above statement but will be defined by the following claims.

I claim:

1. A process for preparation of a nutritive feed for domestic animals which comprises isolating inoculant of nitrogen-fixing *Bacillus Clostridium butyricum* from plants belonging to the family of Fabaceae, cultivating the inoculant in a sterile aqueous culture medium containing materials from vegetable sources as essential ingredients, stabilizing the grown culture fluid by adsorbing said fluid on an adsorbent, and making up a ration with the stabilized culture fluid carried on said adsorbent.

2. A process for preparation of a nutritive feed for domestic animals which comprises isolating inoculant of nitrogen-fixing *Bacillus Clostridium butyricum* from the extract of seeds, belonging to the family of Fabaceae, cultivating the inoculant in a sterile aqueous culture medium containing materials from vegetable sources as essential ingredients, stabilizing the grown culture fluid while the bacilli are concentrated and active by adsorbing said fluid on an adsorbent and making up a ration with the stabilized culture fluid carried on said adsorbent.

3. A process for preparation of a nutritive feed for domestic animals which comprises cultivating nitrogen-fixing *Bacillus Clostridium butyricum* isolated from the extract of seeds belonging to the family of Fabaceae in a sterile aqueous culture medium free from iron and containing materials from vegetable sources as essential nutritious ingredients at a pH of substantially neutral and at a temperature within the range from 35 to 40° C. until sufficient bacilli have grown in the fluid without contamination with other microorganisms; stabilizing the grown culture fluid, before the bacilli are destroyed by bacteriolysis or by bacteriophage, by adsorbing said fluid on an adsorbent and making up a ration with said adsorbent carrying the culture containing nitorgen-fixing *Bacillus Clostridium butyricum* in living state.

4. A process in accordance with claim 1 wherein the culture medium is an iron-free aqueous medium containing extracts of soybean and wheat fluor from which gluten has been removed.

5. A process in accordance with claim 1 wherein the culture medium also contains glucose, vitamin $B_1$ and calcium.

6. A process in accordance with claim 1 wherein wheat bran is used as the adsorbent for the grown culture fluid.

7. A process in accordance with claim 1 wherein bentonite is used as the adsorbent for the grown culture fluid.

8. A process for the preparation of nutritive feed for domestic animals which comprises isolating inoculant by boiling an extract of seeds of plants belonging to the family of Fabaceae at 100° C. for thirty minutes repeatedly until all microorganisms other than the spores of Clostridia and *Bacillus subtilis* are destroyed and then destroying the aerobic *Bacillus subtilis* by incubation in the absence of air, cultivating the inoculant in a sterile aqueous culture medium containing materials from vegetable sources as essential ingredients, stabilizing the grown culture fluid on an adsorbent, and making up a ration with the stabilized culture fluid carried on said adsorbent.

References Cited in the file of this patent
UNITED STATES PATENTS 2,202,161   Miner _____ May 28, 1940

OTHER REFERENCES

Chem. Abst. 45 (1951) 6711[d] from Baker et al., J. Path. Bac. 62 (1950), pages 617–38.